US010296800B2

(12) United States Patent  
Miao et al.

(10) Patent No.: US 10,296,800 B2  
(45) Date of Patent: May 21, 2019

(54) MEDIA VALIDATION PROCESSING

(71) Applicant: NCR Corporation, Duluth, GA (US)

(72) Inventors: Yun-Qian Miao, Waterloo (CA); Gary Alexander Ross, Dundee (IE)

(73) Assignee: NCR Corporation, Atlanta, GA (US)

( * ) Notice: Subject to any disclaimer, the term of this patent is extended or adjusted under 35 U.S.C. 154(b) by 63 days.

(21) Appl. No.: 15/497,336

(22) Filed: Apr. 26, 2017

(65) Prior Publication Data

US 2018/0314904 A1 Nov. 1, 2018

(51) Int. Cl.
| | |
|---|---|
| G06K 9/00 | (2006.01) |
| G06K 9/18 | (2006.01) |
| G06K 9/46 | (2006.01) |
| G06K 9/66 | (2006.01) |
| G07D 7/12 | (2016.01) |
| G07D 7/20 | (2016.01) |
| G07D 7/187 | (2016.01) |
| G07D 7/189 | (2016.01) |

(52) U.S. Cl.
CPC ......... *G06K 9/186* (2013.01); *G06K 9/00442* (2013.01); *G06K 9/4604* (2013.01); *G06K 9/66* (2013.01); *G07D 7/12* (2013.01); *G07D 7/187* (2013.01); *G07D 7/189* (2017.05); *G07D 7/2083* (2013.01)

(58) Field of Classification Search
CPC .. G06K 9/186; G06K 9/00442; G06K 9/4604; G06K 9/66; G07D 7/12
See application file for complete search history.

(56) References Cited

U.S. PATENT DOCUMENTS

| | | | |
|---|---|---|---|
| 3,782,543 A * | 1/1974 | Martelli | G07D 7/12 |
| | | | 209/534 |
| 4,189,235 A | 2/1980 | Guter et al. | |
| 5,874,742 A * | 2/1999 | Romano | G01N 21/6447 |
| | | | 250/458.1 |
| 6,744,050 B1 * | 6/2004 | Hornung | G07D 7/12 |
| | | | 250/341.1 |
| 7,034,324 B2 * | 4/2006 | Voser | G07D 7/121 |
| | | | 250/556 |
| 7,607,528 B2 | 10/2009 | Derks et al. | |
| 8,162,125 B1 * | 4/2012 | Csulits | G07D 7/12 |
| | | | 194/206 |
| 2004/0134744 A1 * | 7/2004 | Voser | G07D 7/121 |
| | | | 194/207 |

(Continued)

FOREIGN PATENT DOCUMENTS

EP 2256698 A1 12/2010

OTHER PUBLICATIONS

EP Search Report—dated Sep. 19, 2018.

*Primary Examiner* — Brenda C Bernardi  
(74) *Attorney, Agent, or Firm* — Schwegman, Lundberg & Woessner

(57) ABSTRACT

Ultraviolet (UV) light illuminates a valuable media item along a pathway of a valuable media depository and UV signal readings are captured in response to the illuminated valuable media item. The signal readings are adjusted to account for any integrated metallic material and for any contamination present on the media item or any contamination that is a result of the media item having been washed. The adjusted signal readings are processed to determine whether the media item is genuine and/or fit for being further processed within the depository.

6 Claims, 10 Drawing Sheets

(56) References Cited

U.S. PATENT DOCUMENTS

| | | | | |
|---|---|---|---|---|
| 2007/0142112 A1* | 6/2007 | Hobmeier | ............ | G07D 7/0006 463/29 |
| 2013/0341902 A1* | 12/2013 | Eastwood | ................ | G02B 5/10 283/85 |
| 2016/0304304 A1* | 10/2016 | Link | ......................... | B65H 7/02 |
| 2017/0106690 A1* | 4/2017 | Lee | ...................... | B42D 25/328 |
| 2018/0032805 A1* | 2/2018 | Choi | .................. | G06K 9/00442 |
| 2018/0043724 A1* | 2/2018 | Hardwick | ............ | B42D 25/328 |

\* cited by examiner

FIG. 1B

| Testcase | Genuine #Testnote | Original DVM #Fail-UV | Fail-% | DVM with Solution #Fail-UV | Fail-% | Counterfeit #Testnote | Original DVM #Pass-UV | Pass-% | DVM with Solution #Pass-UV | Pass-% |
|---|---|---|---|---|---|---|---|---|---|---|
| CAD-$5 | 5910 | 93 | | 0 | | - | | | | |
| CAD-$10 | 5829 | 264 | | 2 | | - | | | | |
| CAD-$20 | 7941 | 254 | | 10 | | 320 | 18 | | 0 | |
| CAD-$50 | 3960 | 475 | | 0 | | 120 | 0 | | 0 | |
| CAD-$100 | 6816 | 229 | | 0 | | - | | | | |
| Sum | 30456 | 1315 | 4.32% | 12 | 0.04% | 440 | 18 | 4.09% | 0 | 0% |

FIG. 1G

MEDIA VALIDATION PROCESSING

BACKGROUND

Media handing devices that process media documents and bunches of media documents after separating the media documents for individual processing downstream within the media handling devices. Media handing devices include a variety of integrated components. One type of media document is a banknote or currency note (note).

As the note is processed through the media handling device, a variety of sensors are activated and deactivated to track movement of the note and indicate where the note is located along the transport pathway.

Typically, track sensors or photodiode (emitter) and phototransistor pairs, located on the same or opposing sides of the document track are activated before and/or after media handling components for purposes of transmitting a presence of the mote on the track as signals to integrated controllers within the media handling devices.

Depending on the location of a note along the pathway, other devices may be activated, such as a media validation module (device) located in a designated area along the pathway. The media validation module may include cameras, sensors (Infrared, Ultraviolet (UV), etc.) and Light Emitting Diodes (LEDs) that illuminate the face of the note to capture different characteristics of the note for purposes of determining whether the note is counterfeit (fake) or unfit in some manner (excessively damaged).

Metallic foil-based security features are a common overt security feature utilized on many currency designs to thwart counterfeiters. While this design raises the barrier for preventing successful counterfeiting, such designs also present new challenges to automatic media validation processing within the media handling device. For example, a UV fluorescence sensor is typically deployed within a media validation module for identifying washed out banknotes and assisting with counterfeit detection. The foil's mirror-like surface introduces a specular reflection not normally associated with banknotes. This specular surface can cause glare into any optical sensor including the UV sensor. The UV sensor is there to detect anomalies in the UV response of a banknote—which is typically low due to the non-fluorescent paper. However, laundry accidents, many clear tapes plus other contaminants can cause whole or partial high UV response. These need to be detected for proper media fitness detection, and in some countries the washed and/or heavily contaminated notes have to be segregated from genuine fit notes (for governmental replacement with new fit notes). The foil however, is an integral part of the note and effects from it need to be ignored from the fitness or counterfeit decision processes.

Thus, determining whether a note is genuine and/or in an acceptable condition (fit) for being accepted for a transaction within a media handling device is problematic when the note includes foil security features and/or contaminants. As a result, conventional media handling devices have higher than desired acceptance rates and lower than desired rejection rates for notes having foil security features and/or contaminants.

SUMMARY

In various embodiments, methods and a system for media validation processing within a valuable media depository are provided.

According to an embodiment, a method for media validation processing is presented. Specifically, and in one embodiment, sensor readings are processed to deduce an area of a media item having a metallic material. Next, a tolerance level is identified for any contamination associated with the media item. Finally, a determination is made as to whether the media item is acceptable for further processing within a depository based on the sensor readings, the area, and the tolerance level.

BRIEF DESCRIPTION OF THE DRAWINGS

FIG. 1B is a diagram depicting sample currency notes foil security features, according to an example embodiment.

FIG. 1G is a table depicting test results for tests that compares techniques presented herein against known techniques for counterfeit and genuine notes, according to an example embodiment.

DETAILED DESCRIPTION

Figure 1A:
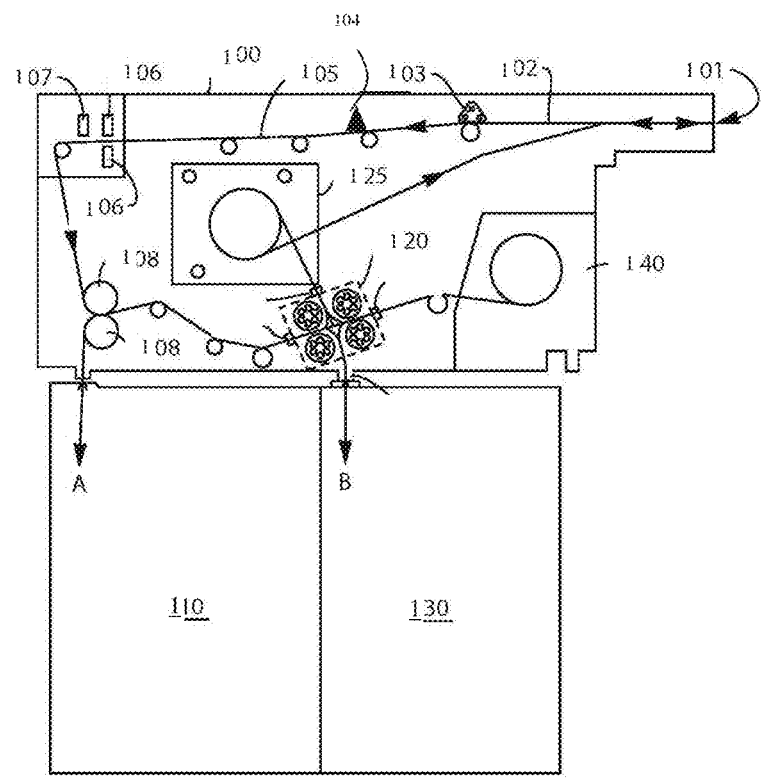
FIG. 1A is a diagram depicting a deposit module of a Self-Service Terminal (SST) having a media validation device (module), according to an example embodiment.

FIG. 1A is a diagram depicting a deposit module of a Self-Service Terminal (SST) having a media validation device (module), according to an example embodiment. It is to be noted that the valuable media depository is shown with only those components relevant to understanding what has been added and modified to a conventional depository for purposes of providing media tracking within one or more imaging devices integrated within the depository 100.

The depository 100 is suitable for use within an Automated Teller Machine (ATM), which can be utilized to process deposited banknotes and checks (valuable media as a mixed bunch if desired). The deposit module 100 has an access mouth 101 (media or document infeed) through which incoming checks and/or banknotes are deposited or outgoing checks and/or banknotes are dispensed. This mouth 101 is aligned with an infeed aperture in the fascia of the ATM in which the depository 100 is located, which thus provides an input/output slot to the customer. A bunch (stack) of one or more items (valuable media) is input or output. Incoming checks and/or banknotes follow a first transport path 102 away from the mouth 101 in a substantially horizontal direction from right to left shown in the FIG. 1A. They then pass through a novel separator module 103 and from the separator 103 to a deskew module 104 along another pathway portion 105, which is also substantially horizontal and right to left. The items are now de-skewed and aligned for reading by imaging cameras 106 (comprising novel imaging devices as discussed herein and below in greater detail with the FIGS. 1B-1C and 2-4) and a Magnetic Ink Character Recognition (MICR) reader 107 by a media validation module (comprising the cameras 106 and MICR reader 107).

Items are then directed substantially vertically downwards to a point between two nip rollers 108. These nip rollers cooperate and are rotated in opposite directions with respect to each other to either draw deposited checks and/or banknotes inwards (and urge those checks and/or banknotes towards the right hand side in the FIG. 1A), or during another mode of operation, the rollers can be rotated in an opposite fashion to direct processed checks and/or banknotes downwards in the direction shown by arrow A in the FIG. 1A into a check or banknote bin 110. Incoming checks and/or banknotes, which are moved by the nip rollers 108 towards the right, enter a diverter mechanism 120. The diverter mechanism 120 can either divert the incoming checks and/or banknotes upwards (in the FIG. 1A) into a re-buncher unit 125, or downwards in the direction of arrow B in the FIG. 1A into a cash bin 130, or to the right hand side shown in the FIG. 1A into an escrow 140. Items of media from the escrow 140 can selectively be removed from the drum and re-processed after temporary storage. This results in items of media moving from the escrow 140 towards the left hand side of the FIG. 1A where again they will enter the diverter mechanism 120. The diverter mechanism 120 can be utilized to allow the transported checks (a type of valuable media/document) and/or banknotes (another type of valuable media/document) to move substantially unimpeded towards the left hand side and thus the nip rollers 108 or upwards towards the re-buncher 125. Currency notes from the escrow can be directed to the re-buncher 125 or downwards into the banknote bin 130.

As used herein, the phrase "valuable media" refers to media of value, such as currency, coupons, checks, negotiable instruments, value tickets, and the like.

For purposes of the discussions that follow with respect to the FIGS. 1A-1G and 2-4, "valuable media" is referred to as currency (currency note and/or check) and the "valuable media depository" is referred to as a "depository." Additionally, valuable media may be referred to as a "document" and/or "media document" herein. Thus, the terms "note," "media item," "banknote," "currency note," and "document" may be used interchangeably and synonymously herein.

FIG. 1B is a diagram depicting sample currency notes foil security features, according to an example embodiment.

As will be discussed in greater detail, herein and below, an adaptive media validation processing technique is presented that extracts image features derived from UV signal readings, sorts the UV signals, and excludes the UV signals associated with foil and a configurable amount of detected contamination from the media validation decision process. The exclusion areas are automatically derived from detection of any suspected foil areas plus some leeway given for any small area of chemical contamination (e.g. the security pens at stores, or fluorescent pen marks). The various presented embodiments, dynamically adjust the range of UV signals from participating in modeling non-washing notes by using the UV response over banknote's base substrate only. Therefore, it effectively solves the above-identified industry problems and is generic in handling different situations—having foil, no foil, paper notes, and polymer notes.

Metallic foil-based security features (holograms and kinegrams are two of many examples) are a common overt security feature utilized on many currency designs, e.g. Canadian Frontier series, Bank of England current paper notes, and all European Central Bank series, as shown in FIG. 1B. As stated above, foil-based features cause many problems when attempting to perform counterfeit detection on a note.

Figure 1C:
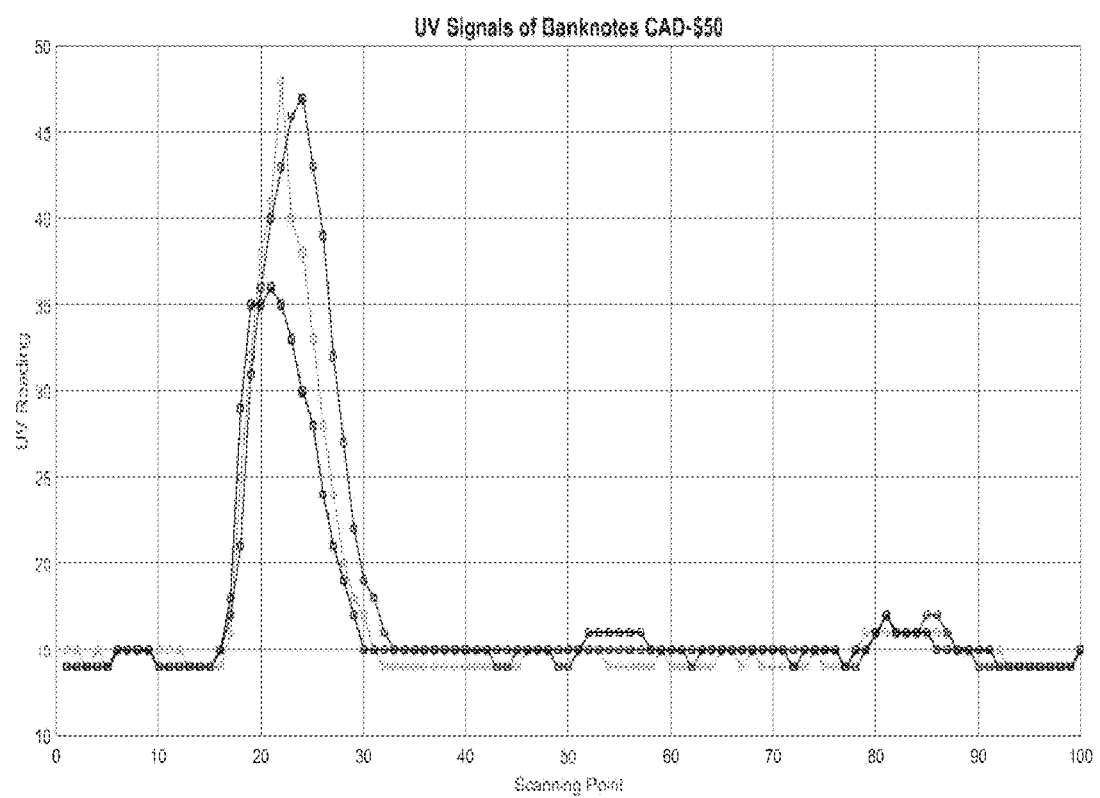
FIG. 1C is a diagram depicting a graph illustrating UV signal readings for a detected foil security feature in a currency note, according to an example embodiment.

The FIG. 1C shows UV signal readings for a banknote having a foil-based integrated material. An expected reading is in a range of 10-15 (voltage units) but the foil-based material produces a substantial spike to nearly 50. The spike is short lived indicating that the foil-based material is present on only a small portion of the overall note, but the spike increases by a factor of nearly 5.

Another phenomenon also occurs in a lifetime of a banknote's circulation where banknotes are contaminated by UV markers, tape, dirt, et al., which also exhibits high level of excitation under UV light exposure. An example of this situation is shown at the top of the graph in the FIG. 1D where the note is exposed to UV light and a small circular ring is present, perhaps from a fluorescent marker made on the face of the note.

Figure 1D:
FIG. 1D is a diagram depicting a currency note having contamination and a graph illustrating UV signal readings for the contamination, according to an example embodiment.
Figure 1D:
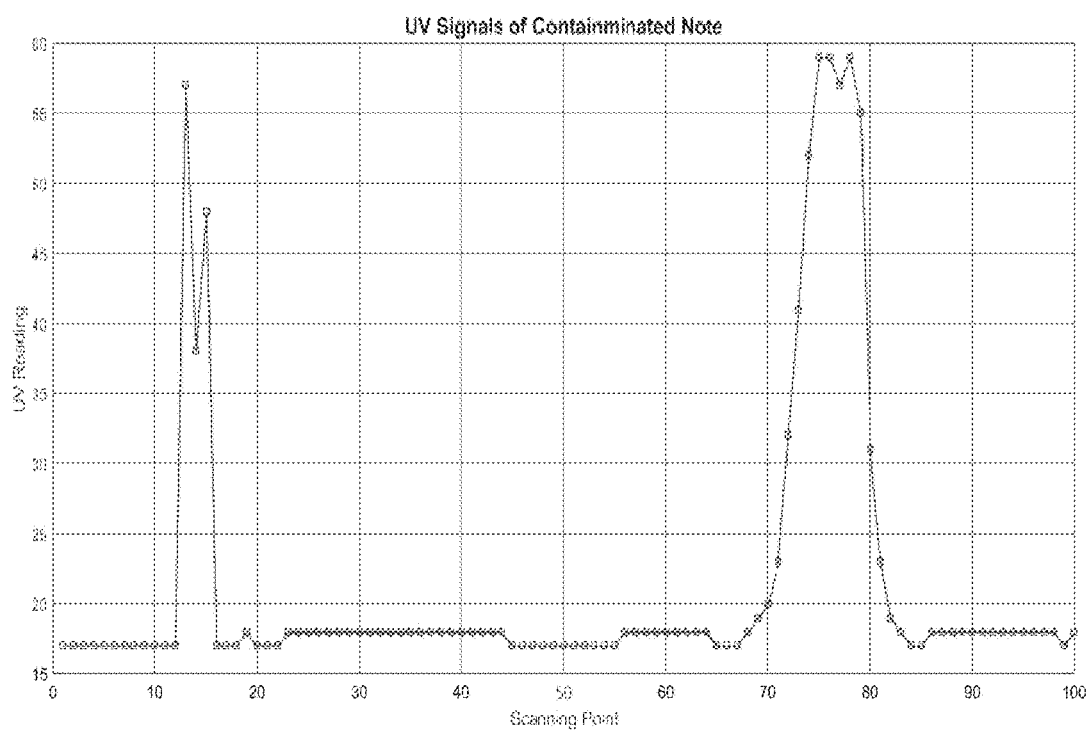
Figure 1E:
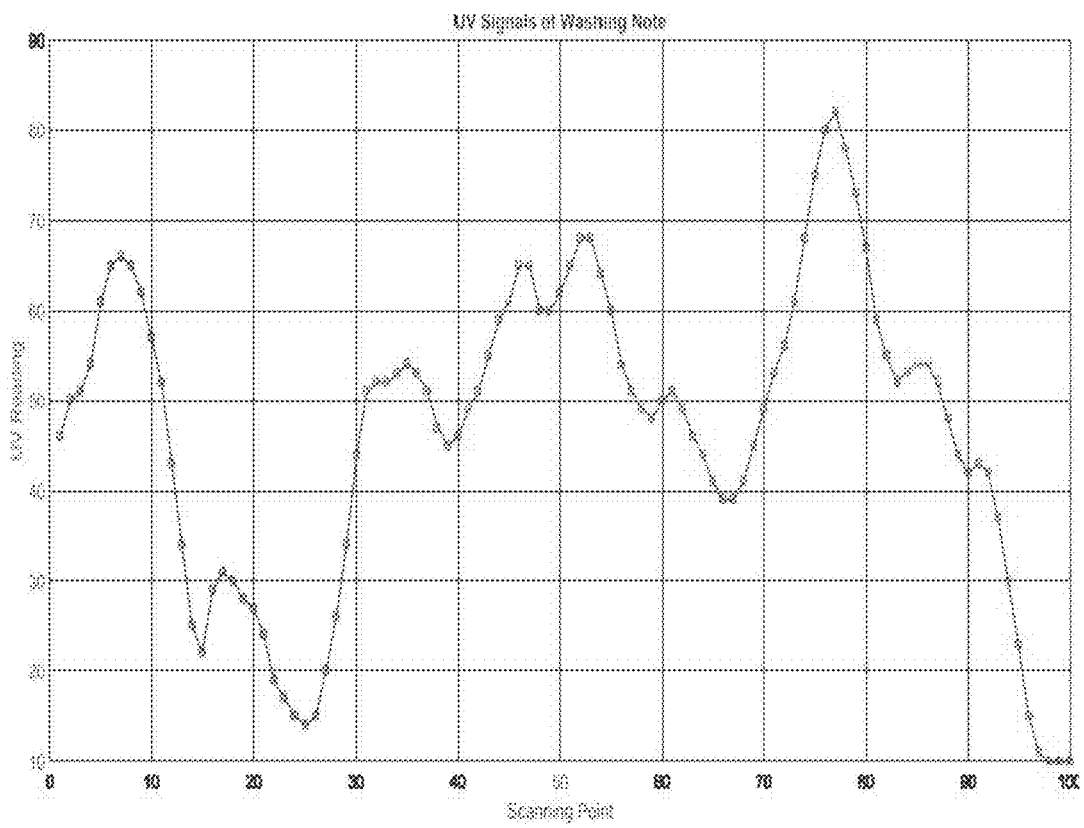
FIG. 1E is a diagram depicting a graph illustrating UV signal readings for a washed currency note, according to an example embodiment.
Figure 1F:
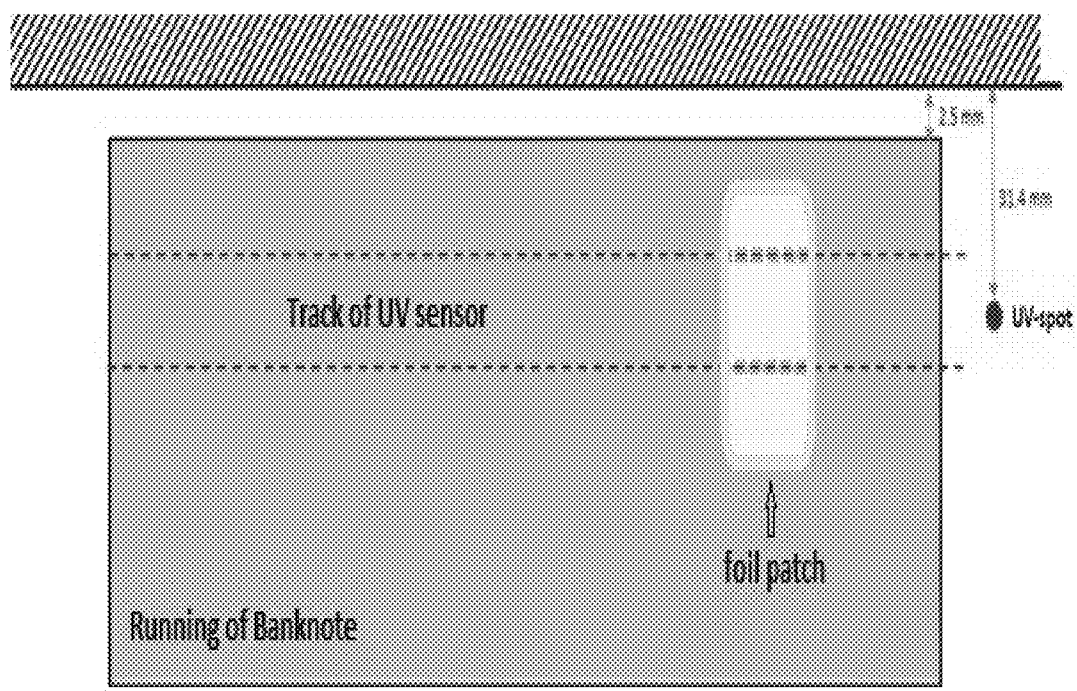
FIG. 1F is a diagram illustrating a percentage of UV signals captured from a UV sensor for a foil patch relative to the note as a whole, according to an example embodiment.

The graph in the FIG. 1D shows that the UV readings include two spikes (with factors of greater than 5) that are spaced out from one another indicative of contamination having areas that are not contaminated, such as the inside of the circle.

Washing notes show varied patterns of UV response instead; high response where the normally UV-dull base paper is exposed, lower where there is dark printing or, ironically, where there is foil at an angle such that specular reflection misses the sensor. An example of the UV signal readings when a washed note is exposed to UV light is shown in the graph presented in the FIG. 1E.

At least one UV sensor situated along the track pathway within the depository 100 within a media validation module detects anomalies in the UV response for a banknote—which is typically low (or expected to be low) due to the non-fluorescent paper used in construction of the note. However, tape, laundry accidents plus other contaminants can cause whole or partial high UV response. Notes that are excessively washed need to be detected for fitness purposes, and in some countries the washed and/or heavily contaminated notes have to be segregated from genuine fit notes within the media handling device. Foil material, however, is an integral part of the note and the UV effects from it need to be ignored from the fitness or counterfeit decision processes (media validation processing).

The processing deployed for solving the above-mentioned note conditions are implemented and integrated with existing template development software as enhancements. The enhanced processing excludes the uncertain portion of UV signal readings that are present over foil patches and models non-washing notes by relying on UV signals over banknote's base substrate.

The enhanced processing proceeds as follows:

1. Read, clean, and align UV sensor readings $\Omega$ (an existing processing approach used with template document software for counterfeit and fitness determination).

2. Deduce the percentage of uncertain portion of UV signals for metallic area ($\alpha$) (enhancement processing to the template document software). It is decided by the track of UV sensor, the foil stripe or patch location and width (taken from currency's definitions), as illustrated in the FIG. 1F. That is, the type of currency that the depository 100 is capable of handling is predefined in templates and based on the signal the patch (foil or metallic) area can be deduced from the UV signal readings provided by the UV track sensor. The signal readings produced from the metallic area was shown in the FIG. 1C.

3. Predefine a rule to tolerate the uncertain portion coming from accident contaminations as β. This is also an enhancement to the template document software and an example set of UV signal readings were shown with the contamination in the FIG. 1D and a washed note in the FIG. 1E.

4. Reshape UV readings as the sorted Ω and excluding uncertain portions (as an enhancement to the template document software), as:

$$\Omega'=\{sort(\Omega)\backslash length(\Omega)*(\alpha+\beta)\}$$

5. Extract a vector of features $\overrightarrow{fea}$ (s) from Ω' for note sample s as (also an enhancement to the template document software):

$$\overrightarrow{fea}(s)=g(\Omega')$$

6. Train non-washing note model and use the model to do online identification of washing note (that, is the training of the existing template document software is used with the new processing of 2-5 and used during operation of the depository 100 for determining whether a note is genuine and/or fit for accepting during a transaction at the depository 100).

As described in the above processing, the first and last step adopt the same interface of existing template document software processing systems, which are enhanced with the new processing reflected in steps 2-5. As such, the processing is completely compatible with existed counterfeit and fitness determination systems and can be deployed/integrated in an incremental manner.

It should also be noticed that usually the contamination percent β should be limited to a small number, such as a single digit, since only small amount of contamination and/or tape is permissible when allowing a note to be designated as being fit for acceptance at the depository 100. Logically, a point exists where large areas of contamination are considered too great and are likely to be associated with fraud (e.g. mutilation/reconstruction), staining, taping, etc. making the note unfit or fraudulent. The decision of where it lies is dependent on data from other sensors as well as the UV sensor described here. This can be configured as thresholds/tolerances and used for determining whether a note is fit or unfit.

Previous approaches used a fixed setup for excluding the effect of foil patches, but these approaches have only demonstrated success under a very limited set of conditions. The diverse designs of foil features, e.g. wide or narrow, degree of metallization, etc. frequently result in model failures with these previous approaches that effectively renders these previous approaches impractical.

The FIG. 1G depicts a table that compares previous approaches (identified in the column DVM (Document Validation Module) failure rate versus the approach presented herein (identified in the column DVM with Solution). Genuine and counterfeit notes were tested. The previous approach exhibited a greater than 4% failure rate whereas the processing presented here just exhibited a 0.04% failure rate in accurately detecting the genuine notes and a 0% failure rate in detecting the counterfeit notes. Accordingly, experimentation demonstrates that the approach presented herein reduces false alarm rates of genuine note detection and also increases true rejection rate of counterfeit/washing (fitness) note detection.

Accordingly, the media validation processing provides several advantages and benefits over what has heretofore been achievable in the industry:

1. It provides a distinct advantage to any depository 100 having the media validation processing integrated into its media (document) validation module (DVM).
2. It is a generic solution and can be applied to different currencies—having foil, no foil, paper notes, and polymer notes.
3. It leads to strong modeling ability of normal circulated notes because of the unrelated variations being removed. Therefore, both the true acceptance of genuine notes (i.e. lowering false alarm rate) and the rejection of counterfeit are enhanced.
4. It re-uses the same interface of current template development systems, and the updates can be implemented incrementally. That means the templates could be updated on selected classes of notes according to their urgency. The not-updated templates would work as they are.
5. It gives flexibility to setup acceptance standard on the size of contamination.
6. It has been shown through experimentation to exhibit higher accuracy rates over existing approaches.

These and other embodiments are now discussed with reference to the FIGS. 2-4.

Figure 2:
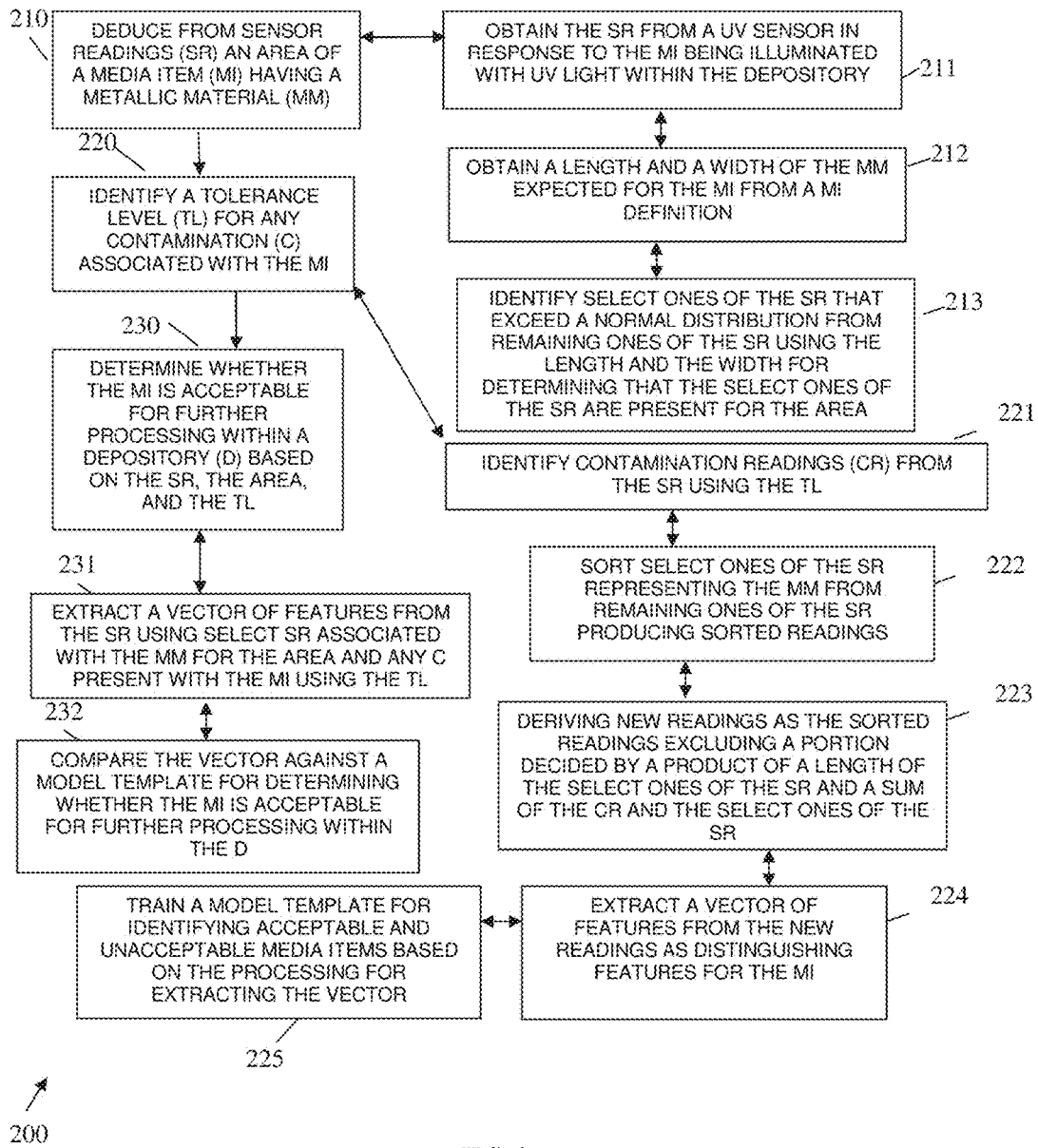
FIG. 2 is a diagram of a method for media validation processing, according to an example embodiment.

FIG. 2 is a diagram of a method 200 for media validation processing, according to an example embodiment. The method 200 when processed provides an indication to the valuable media handing device as to whether a media item is genuine and/fit for acceptance and further processing within the valuable media handling device during a transaction. The method 200 is implemented as executable instructions representing one or more firmware/software modules referred to as a "media validator." The instructions reside in a non-transitory computer-readable medium and are executed by one or more processors of the valuable media depository.

In an embodiment, the media validator is processed within the valuable media depository/dispenser. In an embodiment, the media validator processes within a media validation module (device) or a document validation module (device) that is integrated into the valuable media depository/dispenser. In an embodiment, the valuable media depository/dispenser is the depository 100.

In an embodiment, the valuable media depository/dispenser is a peripheral device integrated into a Self-Service Terminal (SST). In an embodiment, the SST is an ATM. In an embodiment, the SST is a kiosk.

In an embodiment, the valuable media depository/dispenser is a peripheral device integrated into a Point-Of-Sale (POS) terminal operated by a clerk.

In an embodiment, the media validator performs, inter alia, the processing discussed above with the FIGS. 1A-1G. In an embodiment, the media validator is an enhancement to an existing media validation process.

At 210, the media validator deduces, from sensor readings, an area of a media item (banknote, currency note, etc.) an area of the media item having a metallic material, such as foil and/or reflective material. The metallic material is purposefully integrated into the substrate of the media item as a security feature of the media item by the issuing government or governmental agency.

According to an embodiment, at 211, the media validator obtains the sensor readings from a UV sensor in response to the media item being illuminated with UV light within the depository as the media item is being transported along a pathway and track of the depository.

In an embodiment of 211 and at 212, the media validator obtains a predefined length and width of the metallic material that is expected for the media item from a media item definition. That is, the types of different media items (denominations, issuing entity, and security features (such as the metallic material)) have characteristics of each type defined in the media item definition, such that the length and width of the metallic material that is expected for a given type is defined and accessible to the media validator within the depository when the media validator performs media validation.

In an embodiment of 212 and at 213, the media validator identifies select ones of the sensor readings that exceed a normal distribution from remaining ones of the sensor readings using the length and the width for purposes of determine that the select readings are present and only occupy the area. Sample UV readings for foil material on a currency note was provided in the FIG. 1C above. The media item definition provides the expected length and width of a valid media item having the metallic material. The area occupied by the select readings that identify the abnormal distribution in the sensor readings and that identifies the presence of the metallic material can be computed and compared against the known expected length and width. This ensure that even when the media item includes a valid metallic material as part of its definition that the obtained readings fall within an area that is to be expected. Variances that exceed a preconfigured amount provide an indication to the media validator that the media item is counterfeit and not genuine whereas variance within the preconfigured amount do not provide any indication that the media item is counterfeit.

At 220, the media validator identifies a tolerance level for any contamination associated with the media item. Any contamination can be associated with: tape on the media item; glue on the media item; ink on the media item; detergents on the media item; chemicals on the media item; an excessively torn media item such that the readings are askew, and the like.

According to an embodiment, at 221, the media validator identifies contamination readings from the sensor readings using the tolerance level. That is, abnormal distributions and spikes in the readings can be detected, such as was presented in the FIGS. 1D (contamination) and 1E (washed note having detergents or other chemical present as contagions). The degree of these readings and/or the distribution from a normal distribution are noted in the tolerance level.

In an embodiment of 221 and at 222, the media validator sorts select ones of the sensor readings (representing the presence of the metallic material) from remaining ones of the sensor readings to produce sorted readings.

In an embodiment of 222 and at 223, the media validator derives new readings as the sorted readings excluding a portion that is decided by a product of a length of the selected ones of the sensor readings (again representing the presence of the metallic material) and a sum of the contamination readings and the select ones. This was shown above along with the processing associated with the calculation following the discussion of the FIG. 1E as the processing step 4 in the processing steps 1-6.

In an embodiment of 223 and at 224, the media validator extracts a vector of features from the new readings as distinguishing features for the media item.

According to an embodiment, at 225, the media validator trains a model template for identifying acceptable an unacceptable media items based on the processing for extracting the vector (processing 222-224).

At 230, the media validator determines whether the media item is acceptable for further processing within a depository based on the sensor readings, the area, and the tolerance level (as discussed in the processing 211-213 and 221-225).

In an embodiment, at 231, the media validator extracts a vector of features from the sensor readings using select sensor readings associated with the metallic material for the area and any contamination present with the media item using the tolerance level.

Figure 3:
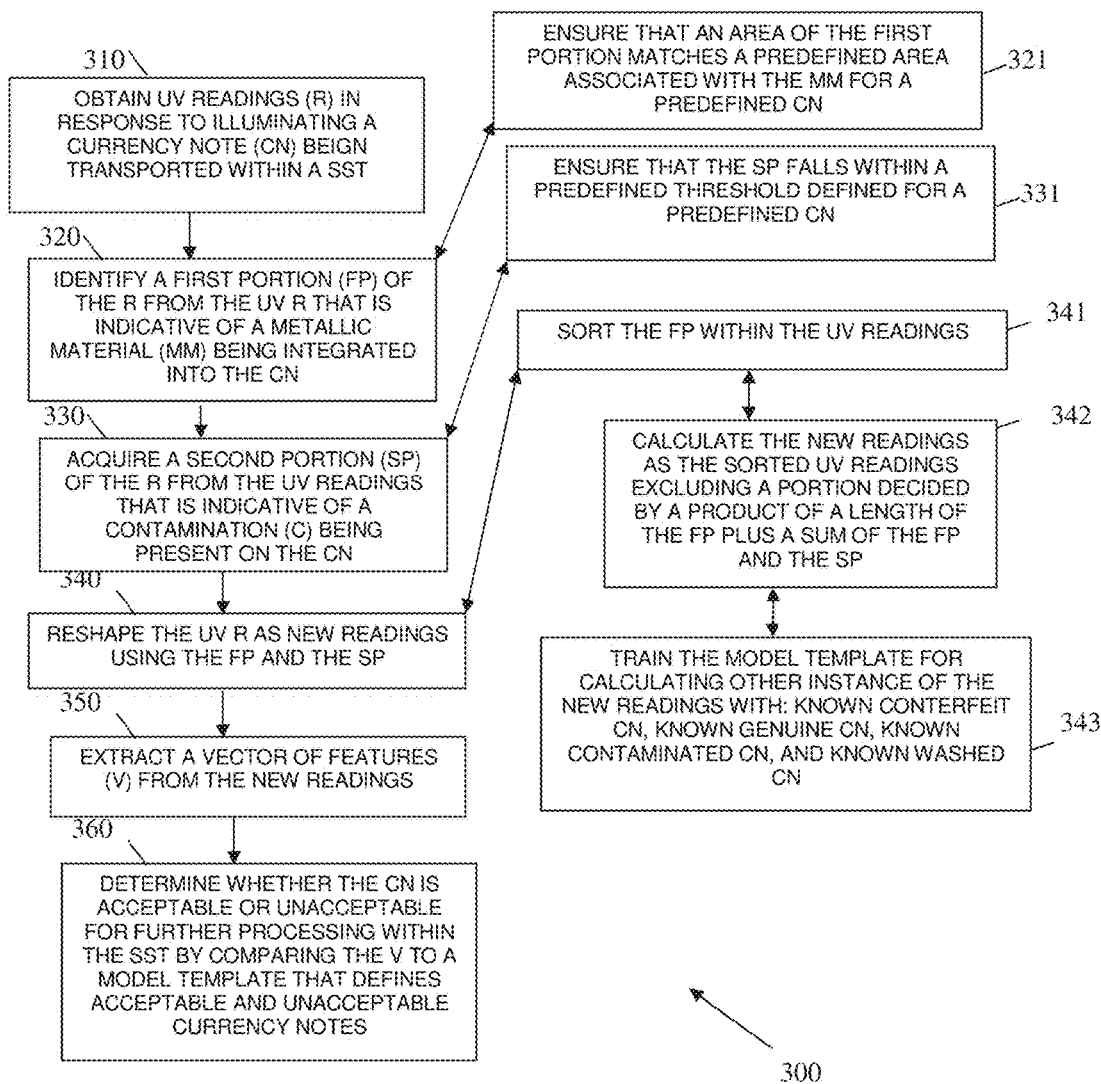
FIG. 3 is a diagram of another method for media validation processing, according to an example embodiment.

FIG. 3 is a diagram of another method 300 for media validation processing, according to an example embodiment. The method 300 when processed controls operation for a media validation module (peripheral device) integrated into a valuable media depository/dispenser. The method 200 is implemented as executable instructions representing one or more firmware/software modules referred to as a "note validator." The instructions reside in a non-transitory computer-readable medium and are executed by one or more processors of the valuable media depository.

In an embodiment, the valuable media depository/dispenser is the depository 100.

In an embodiment, the valuable media depository/dispenser is a peripheral device integrated into a Self-Service Terminal (SST). In an embodiment, the SST is an ATM. In an embodiment, the SST is a kiosk.

In an embodiment, the valuable media depository/dispenser is a peripheral device integrated into a Point-Of-Sale (POS) terminal operated by a clerk.

In an embodiment, the note validator performs all or some combination of the processing discussed above with the FIGS. 1A-1G and 2.

In an embodiment, the note validator is executed as firmware/software programmed instructions in memory of a media validation peripheral device or a depository/dispenser.

In an embodiment, the note validator presents another and in some ways an enhanced processing perspective from that which was described with the method 200 and the FIG. 2.

At 310, the note validator obtains UV readings in response to illuminating a currency note being transported within a SST. The UV readings obtained from a UV sensor situated along a track pathway within the SST.

At 320, the note validator identifies a first portion of the readings from the UV readings that is indicative of a metallic material being integrated into the currency note.

According to an embodiment, at 321, the note validator ensures that an area of the first portion of readings matches or is within a predefined threshold of matching a predefined and expected area that is to be associated with the metallic material for a predefined currency note. Again, this is ensuring that the first portion of readings is within a threshold of what is determined to be acceptable for any security feature integrated into the media item as a security feature.

At 330, the note validator acquires a second portion of the readings from the UV readings that is indicative of a contamination being present on the currency note.

In an embodiment, at 331, the note validator ensures that the second portion of readings fall within a predefined threshold or tolerance defined for a predefined currency note. That is, the amount of permissible contamination is defined by the threshold/tolerance.

At 340, the note validator reshapes the UV readings as new readings using the first portion and the second portion of the readings. This is a calculation, such as the calculation presented above with the FIGS. 1A-1G and 2.

In an embodiment, at 341, the note validator sorts the first portion within the UV readings.

In an embodiment of 341 and at 342, the note validator calculates the new readings as the sorted UV readings excluding a portion that is decided by a product of a length of the first portion plus a sum of the first portion and the second portion.

In an embodiment of 342 and at 343, the note validator trains a model template for calculating other instances of the new readings with: known counterfeit notes, known genuine currency notes, known contaminated currency notes, and known washed currency notes.

At 350, the note validator extracts a vector of features from the new readings.

At 360, the note validator determines whether the currency note is acceptable or unacceptable for further processing within the depository by comparing the vector to a model template that defines acceptable and unacceptable currency notes.

Figure 4:
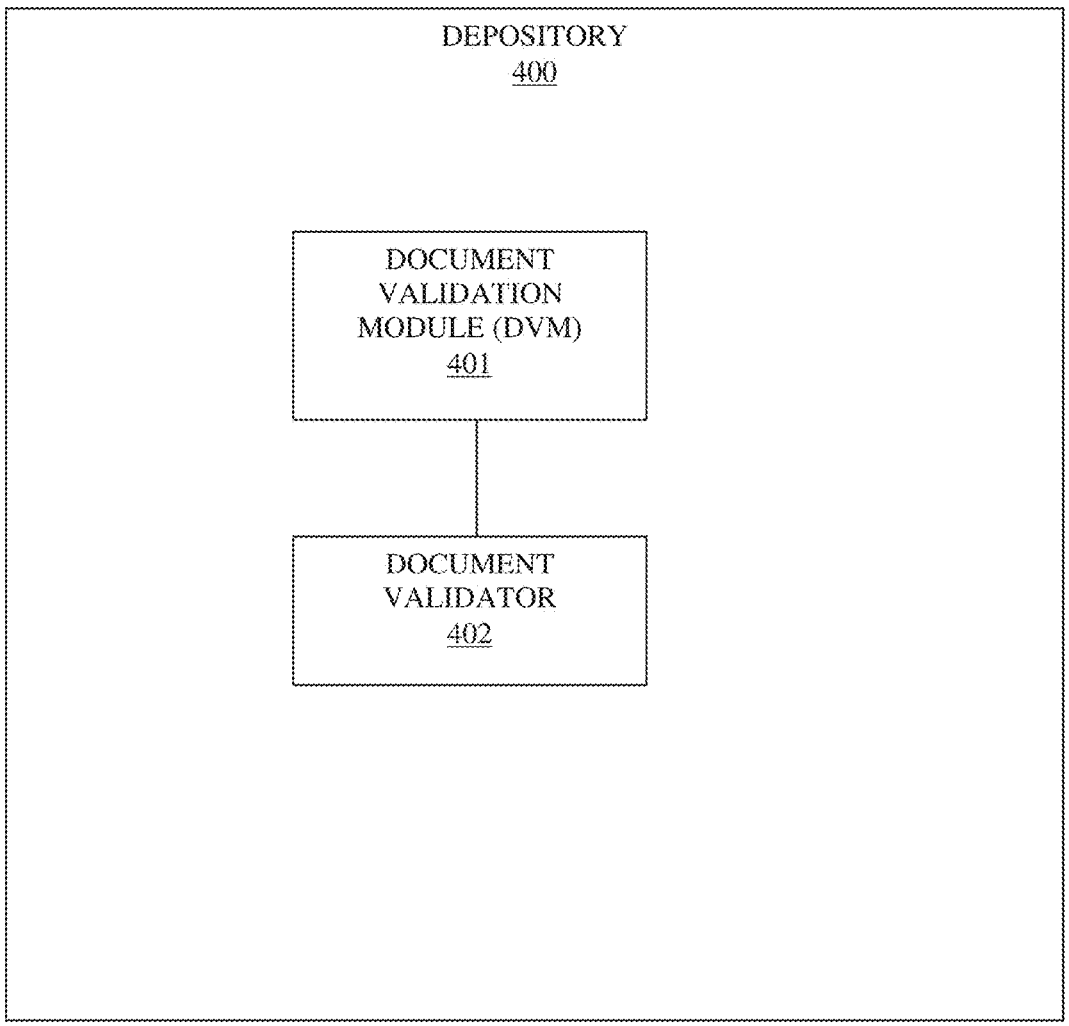
FIG. 4 is a diagram of a valuable media depository, according to an example embodiment.

FIG. 4 is a diagram of a valuable media depository 400, according to an example embodiment. The valuable media depository 400 records and processes UV signal readings using a variety of mechanical, electrical, and software/firmware components (such as UV sensors, UV lighting sources, track pathway, memory, electrical circuitry, processors, etc.), some of which were discussed above with reference to the FIGS. 1A-1G and the FIGS. 2-3.

In an embodiment, the valuable media depository 400 is the depository 100.

In an embodiment, the valuable media depository 400 is integrated within a SST (ATM or kiosk) or a POS terminal.

In an embodiment, the valuable media depository 400 performs, inter alia, all or some combination of the processing discussed above in the FIGS. 1A-1G and 2-3.

The valuable media depository 400 includes a DVM 401 and a document validator 402.

The document validator 401 is configured and programmed to: i) process on at least one hardware processor of the depository 400 or the DVM 401 and ii) determine whether a currency note is genuine and fit for processing within the depository 400 by accounting for any metallic material present in the currency note and an acceptable amount of contamination present on the currency note.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
    obtaining Ultraviolet (UV) readings in response to illuminating a currency note being transported within a Self-Service Terminal (SST);
    identifying a first portion of the readings for the UV readings that is indicative of a metallic material being integrated into the currency note;
    acquiring a second portion of the readings from the UV readings that is indicative of a contamination being present on the currency note;
    reshaping the UV readings as new readings using the first portion and the second portion;
    extracting a vector of features from the new readings; and
    determining whether the currency note is acceptable or unacceptable for further processing within the SST by comparing the vector to a model template for acceptable and unacceptable currency notes.

2. The method of claim 1, wherein identifying further includes ensure that an area of the first portion matches a predefined area associated with the metallic material for a predefined currency note.

3. The method of claim 1, wherein acquiring further includes ensuring that the second portion falls within a predefined tolerance defined for a predefined currency note.

4. The method of claim 1, wherein reshaping further includes sorting the first portion within the UV readings.

5. The method of claim 4, wherein sorting further includes calculating the new readings as sorted UV readings excluding a portion decided by a product of a length of the first portion plus a sum of the first portion and the second portion.

6. The method of claim 5, wherein calculating further includes training the model template for calculating other instances of the new readings with:
    known counterfeit currency notes, known genuine currency notes, known contaminated currency notes, and known washed currency notes.

* * * * *